United States Patent
Lee et al.

(10) Patent No.: US 8,486,340 B2
(45) Date of Patent: Jul. 16, 2013

(54) APPARATUS AND METHOD FOR CONTINUOUSLY PRODUCING AND PELLETIZING GAS HYDRATES USING DUAL CYLINDER

(75) Inventors: Ju Dong Lee, Busan (KR); Hyoung Jae Kim, Busan (KR); Sung Ryul Kim, Busan (KR); Sang Yeon Hong, Daegu (KR); Hye Ok Park, Daegu (KR); Mun Keun Ha, Gyeongsangnam-do (KR); Seok Ku Jeon, Seoul (KR); Hoon Ahn, Seoul (KR); Ta Kwan Woo, Busan (KR)

(73) Assignees: Korea Institute of Industrial Technology, Seoul (KR); Samsung Heavy Industries Co., Ltd., Gyeongsangnam-Do (KR); Hyundai Engineering Co., Ltd., Seoul (KR); Daewoo Engineering & Construction Co., Ltd., Seoul (KR); Sungilturbine Co., Ltd., Busan (KR)

( * ) Notice: Subject to any disclaimer, the term of this patent is extended or adjusted under 35 U.S.C. 154(b) by 309 days.

(21) Appl. No.: 12/776,594

(22) Filed: May 10, 2010

(65) Prior Publication Data
US 2011/0064643 A1    Mar. 17, 2011

(30) Foreign Application Priority Data

Sep. 15, 2009   (KR) .................. 10-2009-0087100
Sep. 15, 2009   (KR) .................. 10-2009-0087101

(51) Int. Cl.
*B01J 19/00*       (2006.01)
(52) U.S. Cl.
USPC ........... 422/162; 422/202; 422/224; 422/234; 585/15

(58) Field of Classification Search
USPC ............... 422/162, 202, 224, 234; 585/15
See application file for complete search history.

(56) References Cited

U.S. PATENT DOCUMENTS

| 5,536,893 | A | 7/1996 | Gudmundsson |
| 6,855,852 | B1 | 2/2005 | Jackson et al. |
| 7,999,141 | B2 * | 8/2011 | Katoh et al. ............ 585/15 |

FOREIGN PATENT DOCUMENTS

| JP | 3173611 A | 7/1991 |
| JP | 07187638 A | * 7/1995 |
| JP | 08151209 A | * 6/1996 |
| JP | 08-338407 | 12/1996 |
| JP | 09-503570 | 4/1997 |

(Continued)

OTHER PUBLICATIONS

Machine Translation for JP 08-151209 A (Jun. 1996).*

(Continued)

*Primary Examiner* — Jennifer A Leung
(74) *Attorney, Agent, or Firm* — RanterPrestia

(57) ABSTRACT

Disclosed herein is an apparatus for continuously producing and pelletizing gas hydrates. The apparatus includes a gas supply unit, a water supply unit and a reactor. Gas and water are respectively supplied from the gas supply unit and the water supply unit into the reactor. The gas and water react with each other in the reactor. The reactor includes a dual cylinder unit which forms a gas hydrate in such a way as to squeeze a slurry of reaction water formed by the reaction between the gas and water. The dual cylinder unit includes an upper cylinder, a lower cylinder and a connection pipe which connects the upper cylinder to the lower cylinder. The connection pipe has passing holes through which the reaction water in the reactor flows into and out of the connection pipe.

13 Claims, 15 Drawing Sheets

FOREIGN PATENT DOCUMENTS

| | | | |
|---|---|---|---|
| JP | 3517832 | B2 | 4/2004 |
| JP | 2006002000 | A * | 1/2006 |
| JP | 3891033 | B2 | 3/2007 |
| JP | 2007268407 | A * | 10/2007 |
| JP | 2007269950 | A * | 10/2007 |
| JP | 4045476 | B2 | 2/2008 |
| KR | 100786812 | B1 | 12/2007 |
| WO | WO 94/29601 | | 12/1994 |

OTHER PUBLICATIONS

Machine Translation for JP 2007-268407 A (Oct. 2007).*
Machine Translation for JP 2007-269950 A (Oct. 2007).*
Machine Translation for JP 2006-002000 A (Jan. 2006).*
English machine translation for JP 07-187638 A (Jul. 1995).*
Office Action for Korean Application No. 10-2009-0087101, Dated Sep. 7, 2011.

* cited by examiner

PRIOR ART

APPARATUS AND METHOD FOR CONTINUOUSLY PRODUCING AND PELLETIZING GAS HYDRATES USING DUAL CYLINDER

BACKGROUND OF THE INVENTION

1. Field of the Invention

The present invention relates generally to an apparatus and method for continuously producing and pelletizing gas hydrates using a dual cylinder and, more particularly, to an apparatus and method for continuously producing and pelletizing high-density gas hydrates containing little water using a squeezing operation of a dual cylinder unit in a reactor.

2. Description of the Related Art

As is well known to those skilled in the art, clathrate hydrates are crystalline compounds in which guest molecules are physically trapped, without chemical bonding, inside a three-dimensional lattice structure formed by hydrogen bonded host molecules. Typically, when the host molecule is water and the guest molecule is a small molecule of gas, such as methane, ethane, propane or carbon dioxide, the clathrate hydrates are called gas hydrates.

Gas hydrates were first discovered in 1810 by Sir Humphry Davy of England. In a Bakerian lecture for The Royal Society of London for Improving Natural Knowledge, he published the fact that when chlorine and water react with each other, compounds having structures similar to ice are formed but the temperature of the compounds is higher than 0° C. In 1823, Michael Faraday discovered the fact that a gas hydrate is formed by reacting one chlorine molecule with ten water molecules. To date, scientific research on gas hydrates as one type of phase change material (PCM) have been regularly conducted. Research into their phase equilibrium, formation/dissociation conditions, coexistence of polycrystals, competitive composition variation in cavities, etc. are representative. In addition, in the microscopic or macroscopic aspect, various detailed research has been being conducted.

About one hundred thirty kinds of guest molecules which can be trapped in host molecules for gas hydrates have been discovered to date. $CH_4$, $C_2H_6$, $C_3H_8$, $CO_2$, $H_2$, $SF_6$, etc. are representative examples of such guest molecules. Furthermore, a gas hydrate crystalline structure forms a polyhedral cavity because of hydrogen bonded host molecules. According to the kind of gas molecules and the formation conditions thereof, the gas hydrate crystalline structures are classified into a body-centered cubic structure I (sI), a diamond cubic structure || (s||) and a hexagonal structure H (sH). In sI and s||, the size of the guest molecule is the critical factor. In sH, the size and shape of the guest molecule are the critical factors.

The most common guest molecule of gas hydrates which are naturally present in deep sea and in permafrost regions is methane. Much attention is being focused on such methane as an environmentally-friendly clean energy resource because little carbon dioxide ($CO_2$) is generated when it burns. In particular, gas hydrates can be used as energy sources which can substitute for fossil fuels. Furthermore, gas hydrates can be applied to natural gas solidification-storage and transfer using the hydrate structure. In addition, gas hydrates can be used in isolation/storage of $CO_2$ for the prevention of global warming. Furthermore, gas hydrates can be used, particularly, in a desalination apparatus, as a technology for separating gaseous or water solutions. As such, gas hydrates are of great utility.

Such gas hydrates are found mainly in regions adjacent to petroleum or natural gas reservoirs or coal seams, or in low temperature and high pressure bathyal deposits, in particular, continental slopes. Furthermore, gas hydrates may be artificially produced. A representative conventional apparatus for producing gas hydrates typically has the structure illustrated in FIG. 1.

FIG. 1 is a schematic view showing a typical apparatus for producing gas hydrates, according to a conventional technique.

The gas hydrate producing apparatus 10 according to the conventional technique includes a water supply unit 1, a gas supply unit 2, a reactor 3 and a discharge unit 5. Water is supplied from the water supply unit 1 into the reactor 3 and gas is supplied from the gas supply unit 2 into the reactor 3. The water and gas react with each other in the reactor 3. Gas hydrates produced in the reactor 3 are discharged from the reactor through the discharge unit 5. The apparatus 10 may further include an agitator 4 to increase the reaction rate between the water and the gas.

In detail, representative examples of such conventional techniques disclosed in documents will be introduced herein below.

Apparatuses or methods of producing gas hydrates were proposed in Japanese Patent Registration No. 3173611, U.S. Pat. No. 5,536,893 and U.S. Pat. No. 6,855,852. These conventional techniques have in common the operation of supplying gas, the operation of supplying water, the operation of producing gas hydrate particles by reacting gas and water with each other, and an agglomerating operation. Some of these techniques further include a recycling gas operation and a cooling operation.

Furthermore, a method of producing hydrates using a water spraying manner was proposed in Japanese Patent Registration No. 3517832. In this technique, water is supplied from a water supply unit into a reactor in such a way as to spray water into the reactor. Therefore, when water is supplied into the reactor, the contact area of water with the gas is increased, thereby enhancing the reaction rate between water and gas.

Another conventional technique was proposed in Japanese Patent Registration No. 4045476, entitled "Apparatus and method of producing gas hydrates". In this technique, gas is mixed with and dissolved in water to form reaction water. The reaction water flows through a predetermined pipeline. A separate cooling unit cools the pipeline.

Furthermore, another conventional technique was proposed in Japanese Patent Registration No. 3891033, entitled "Apparatus for consecutively producing gas hydrates". This apparatus includes a rotating drive shaft, blades and a take-out pipe. The rotating drive shaft is installed upright in a reactor in which water and gas react with each other. The blades are provided at positions spaced apart from the center of the rotating drive shaft with respect to the radial direction by a predetermined distance. The blades are disposed such that the surface of reaction water comes into contact with the blades. The blades rotate around the rotating drive shaft. Slurry which gathers around the rotating drive shaft because of the rotation of the blades is discharged below the reactor through the discharge pipe.

In addition, another conventional technique was proposed in Korean Patent Registration No. 0786812, entitled "Gas hydrate producing or dissolving apparatus having constant temperature maintaining tank". The apparatus according to this technique includes a reaction chamber in which gas hydrates are formed by water and gas reacting with each other or are dissolved, and a constant temperature maintaining tank which maintains the temperature of the water in the reaction chamber at a constant.

However, the apparatuses according to the above-mentioned conventional techniques have in common the following problems.

In the conventional apparatuses, it is difficult to continuously produce gas hydrates. In the case of the apparatuses provided in Japanese Patent Registration No. 3173611, U.S. Pat. No. 5,536,893, U.S. Pat. No. 6,855,852, Japanese Patent Registration No. 3517832 and Korean Patent Registration No. 0786812, several gas hydrates can be produced in a laboratory. However, few concrete studies into a process of extracting gas hydrates from reaction water formed by gas and water have been carried out. Furthermore, in these apparatuses, excessive time and power are required to produce gas hydrates. Therefore, it is almost impossible to continuously produce gas hydrates.

Moreover, in the apparatuses according to the conventional techniques, the process of producing gas hydrates is very long and complex. In particular, the technique disclosed in Japanese Patent Registration No. 4045476 provides the apparatus for consecutively producing gas hydrates, but the process of extracting gas hydrates from a slurry of reaction water is very complex. Furthermore, in all operations of the gas hydrate producing process, the temperatures and pressures of components of the apparatus must be maintained at a constant. Hence, substantially, there are many restrictions in the process of continuously producing gas hydrates. In addition, it is also very difficult to maintain the temperature and pressure of all components at a constant in all of the operations of the process.

Furthermore, because the interior of the reactor must be maintained under high pressure in response to conditions for producing gas hydrates, it is not easy to inject gas into the reactor which is under high pressure. Furthermore, because the reaction rate between gas and water cannot be increased, the gas hydrate production rate cannot be enhanced.

SUMMARY OF THE INVENTION

Accordingly, the present invention has been made keeping in mind the above problems occurring in the prior art, and an object of the present invention is to provide an apparatus and method for continuously producing and pelletizing gas hydrates using a dual cylinder.

In particular, the present invention provides the apparatus and method for easily and rapidly extracting a gas hydrate pellet or a dehydrated high-density gas hydrate from a reactor containing a slurry formed by reaction between water and gas.

Another object of the present invention is to provide an apparatus and method in which a slurry is formed by reacting gas with water and a dehydrated high-density gas hydrate can be simultaneously formed in the same space.

In order to accomplish the above object, in an aspect, the present invention provides an apparatus for continuously producing and pelletizing gas hydrates, including: a gas supply unit; a water supply unit; and a reactor into which gas and water are respectively supplied from the gas supply unit and the water supply unit. The gas and water react with each other in the reactor. The reactor includes a dual cylinder unit forming a gas hydrate in such a way as to squeeze a slurry of reaction water formed by the reaction between the gas and water.

The dual cylinder unit may include: an upper cylinder; a lower cylinder; and a connection pipe connecting the upper cylinder to the lower cylinder. The connection pipe may have a plurality of passing holes through which the reaction water in the reactor flows into and out of the connection pipe.

The upper cylinder may include: an upper piston; and an upper cylinder casing in which a portion of the upper piston is placed. The upper cylinder casing may contain an incompressible fluid. The lower cylinder may include: a lower piston; and a lower cylinder casing in which a portion of the lower piston is placed. The lower cylinder casing may contain the incompressible fluid. The dual cylinder unit may further include: an actuator connected to the upper cylinder and the lower cylinder to provide drive force to the upper and lower cylinders; and a pipeline connecting the upper cylinder casing to the lower cylinder casing to guide flow of the incompressible fluid between the upper cylinder casing and the lower cylinder casing. Movement of the upper and lower pistons may be controlled by the flow of the incompressible fluid between the upper and lower cylinder casings through the pipeline.

The pipeline may comprise: a first pipeline having a pair of flow path change valves thereon; and a second pipeline connecting the pair of flow path change valves to each other. The actuator and the flow path change valves may be electrically connected to a controller.

The controller may control directions in which the flow path change valves are opened or closed, such that a distance between the upper piston and the lower piston is maintained constant or changes.

The slurry of the reaction water may be drawn into the dual cylinder unit through the passing holes of the connection pipe by rotation of the reaction water. The slurry may be squeezed by a squeezing stroke of the upper and lower pistons.

The lower cylinder may include two sensors provided at different heights. Thereby, a height of the formed gas hydrate may be controlled by adjusting the heights of the two sensors.

The plurality of passing holes may comprise a first passing hole and a second passing hole. The first passing hole may be positioned above the second passing hole. The first passing hole may be larger than the second passing hole.

The apparatus may further include a venturi valve connected to the gas supply unit through a first gas supply pipe. The venturi valve may be connected to the water supply unit through a water supply pipe and being connected to the reactor through a mixture supply pipe.

The venturi valve may be connected to the reactor through a second gas supply pipe.

Furthermore, gas supplied from the gas supply unit through the gas supply pipe may be mixed, by the venturi valve, with water supplied from the water supply unit through the water supply pipe, and then a mixture of the gas and the water is supplied into the reactor through the mixture supply pipe. Gas other than the gas reacting with the water in the reactor may be returned to the venturi valve through the second gas pipe and mixed with water supplied into the venturi valve and then resupplied into the reactor through the mixture supply pipe.

The apparatus may further include a pelletizer extracting the formed gas hydrate out of the dual cylinder unit.

The dual cylinder unit may have an extraction hole, and the pelletizer may be operated when the gas hydrate formed in the dual cylinder unit is disposed at a position corresponding to the extraction hole.

The apparatus may further include a cooling unit. The reactor may further include a plurality of cooling water paths formed in a housing of the reactor. The cooling water paths may communicate with the cooling unit.

In another aspect, the present invention provides a method of consecutively producing and pelletizing gas hydrates, including: (a) forming reaction water in a reactor by supplying water and gas into the reactor; (b) agitating the reaction water to form a slurry in the reaction water; (c) forming a gas hydrate by squeezing the slurry using a dual cylinder unit; and (d) extracting the gas hydrate from the dual cylinder unit using a pelletizer.

Furthermore, (a) forming the reaction water and (b) agitating the reaction water may be continuously conducted depending on a preset production amount of gas hydrates, and (c) forming the gas hydrate and (d) extracting the gas hydrate may be conducted in consecutive order.

In addition, (c) forming the gas hydrate may include: (c1) positioning an upper piston of an upper cylinder and a lower piston of a lower cylinder of the dual cylinder unit at initial positions; and (c2) squeezing the slurry in the dual cylinder unit by moving the lower piston a plurality of times downwards.

Preferably, (c) forming the gas hydrate may further include (c2') moving the lower piston downwards by a preset height of the gas hydrate during (c2) squeezing the slurry.

Moreover, (c) forming the gas hydrate may further include (c3) positioning the upper and lower pistons to positions corresponding to an extraction position at which the gas hydrate is extracted from the dual cylinder unit.

Furthermore, (a) forming the reaction water may include: (a1) supplying water into the reactor; (a2) supplying water and gas to a venturi valve; and (a3) supplying the water and gas from the venturi valve into the reactor.

In addition, (a) forming the reaction water may further include (a4) returning gas other than gas reacting with water in the reactor to the venturi valve.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Hereinafter, a preferred embodiment of the present invention will be described in detail with reference to the attached drawings.

The term 'gas' denotes guest molecules of a gas hydrate. The term 'water' denotes host molecules. Various kinds of molecules, such as $CH_4$, $C_2H_6$, $C_3H_8$, $CO_2$, $H_2$, $SF_6$, etc. can be used as guest molecules when producing the gas hydrate. Below, such guest molecules will be referred to as gases and the host molecules will be called water ($H_2O$).

Furthermore, a product formed by an apparatus of the present invention will be referred to as a gas hydrate or a pelletized gas hydrate (hereinafter, referred to as a gas hydrate pellet). A process of forming a gas hydrate pellet will be called a pelletizing process. The apparatus of the present invention can produce a gas hydrate. According to the determination of a manufacturer or user, the apparatus of the present invention can produce a gas hydrate pellet.

Figure 1:
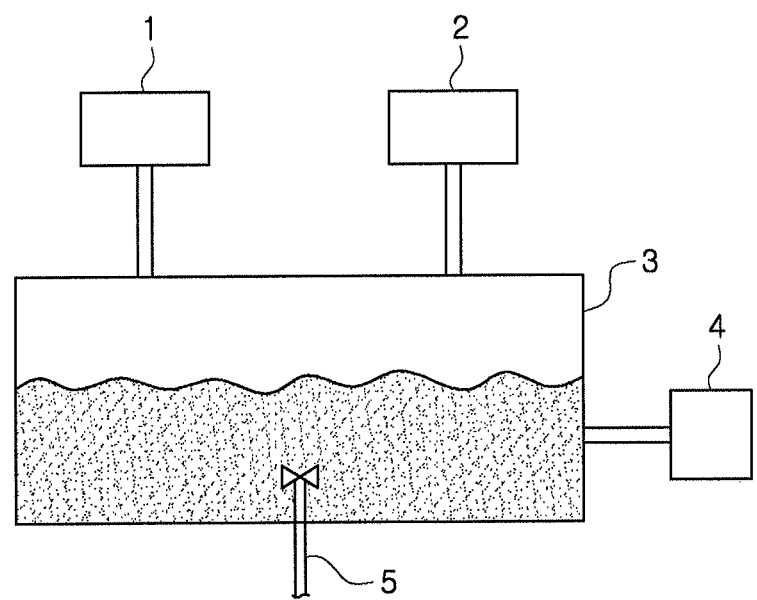
FIG. 1 is a schematic view showing an apparatus for producing gas hydrates, according to a conventional technique.
Figure 2:
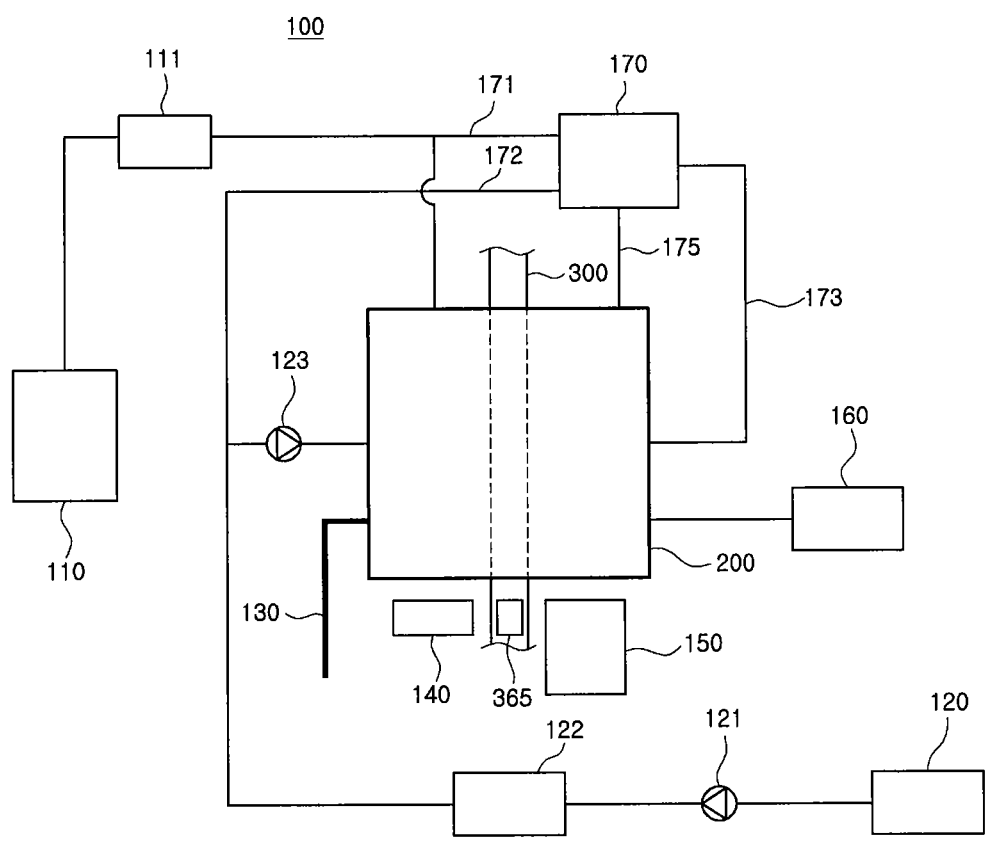
FIG. 2 is a schematic view illustrating an apparatus for continuously producing gas hydrates, according to an embodiment of the present invention.

The General Construction of an Apparatus for Consecutively Producing Gas Hydrates Hereinafter, an apparatus 100 for consecutively producing gas hydrates according to the present invention will be described with reference to FIG. 2.

In the apparatus 100 according to the present invention, ball valves or check valves can be provided on the front and rear of each of a supply unit, pumps and tanks or on flow paths connecting the components to each other. However, in the drawing, the ball valves and check valves will be omitted for the sake of description.

Furthermore, temperature sensors and pressure sensors are provided on a reactor, the supply unit and the tanks. The sensors, valves and pumps can be connected to and controlled by a controller. However, for the sake of description, the sensors and the controller will also be omitted in the drawings.

In addition, a control unit which controls the apparatus 100 according to parameters input by a user is connected to the controller, but this will be also omitted in the drawing for the sake of description.

Moreover, this drawing is a schematic view showing the general construction of only one embodiment of the apparatus 100 of the present invention. Therefore, the scope of the present invention is not limited by the positions or the arrangement of the components illustrated in the drawing or by the method of connection therebetween.

The apparatus 100 according to the embodiment of the present invention includes a gas supply unit 110, a water supply unit 120 and a reactor 200. The gas supply unit 110 and the water supply unit 120 respectively supply gas and water to the reactor 200.

The apparatus 100 further includes an exhaust unit 130, a pelletizer 140, a storage container 150 and a cooling unit 160. Fluid is exhausted out of the reactor 200 through the exhaust unit 130. The pelletizer 140 extracts a gas hydrate pellet which is the product. The storage container 150 stores the extracted gas hydrate pellets therein. The cooling unit 160 supplies cooling water to a portion of the reactor 200 and some of the pipes connected to the reactor 200 which must be maintained at low temperature.

Furthermore, the apparatus 100 further includes a venturi valve 170 which is configured such that water and gas smoothly mix with each other before the mixture is supplied into the reactor 200.

Moreover, the apparatus 100 may further include a separate agitator (not shown) which agitates reactant water in the reactor 200, and a heater (not shown) which prevents components, such as a sensor (not shown) and so on in the reactor 200 from freezing.

The gas supply unit 110 supplies into the reactor 200 the gas required to form gas hydrates. The gas supply unit 110 may be directly connected to the reactor 200. Preferably, a buffer tank 111 is connected between the gas supply unit 110 and the reactor 200 in terms of safety, because a process of forming gas hydrates is conducted under conditions of high pressure.

The buffer tank 111 temporarily stores gas supplied from the gas supply unit 110 and supplies it into the reactor 200 or the venturi valve 170. A pressure sensor (not shown) and a valve (not shown) are installed in the buffer tank 111. The pressure in the buffer tank 111 is maintained higher than that in the reactor 200, so that gas can be automatically supplied from the buffer tank 111 into the reactor 200 by a difference in pressure therebetween. In the case where the venturi valve 170 is used, gas is supplied from the buffer tank 111 into the reactor 200 via the venturi valve 170. This will be explained later in detail with reference to FIG. 3.

The water supply unit 120 supplies water required to form gas hydrates into the reactor 200. The water supply unit 120 may be directly connected to the reactor 200. Preferably, a feed tank 122 is connected between the water supply unit 120 and the reactor 200 for the sake of convenience of the work of replenishing the water supply unit 120 with water in consideration of the fact that the process of forming gas hydrates is conducted under conditions of high pressure.

In the embodiment, water is supplied from the water supply unit 120 to the feed tank 122 by a feed pump 121. The water is directly supplied from the feed pump 121 to the reactor 200 by a circulation pump 123 or, alternatively, it is supplied to the reactor 200 via the venturi valve 170.

The exhaust unit 130 is connected to the reactor 200. When necessary, fluid is discharged out of the reactor 200 through the exhaust unit 130.

The pelletizer 140 is configured such that after a gas hydrate pellet 400 formed in the reactor 200 is discharged from the reactor 200 by a dual cylinder unit 300, the pelletizer 140 pushes the formed gas hydrate pellet 400 and sends it into the storage container 150 through an extraction hole 260. The principle of the operation of the pelletizer 140 will be explained later in detail with reference to FIG. 7.

The cooling unit 160 supplies cooling water to the reactor 200 and major pipes through a cooling water line (not shown) such that they can be maintained at predetermined temperatures. Cooling water supplied to the reactor 200 circulates in a reactor housing 240 of the reactor 200 along a reactor cooling water line 241 (refer to FIG. 6B).

The reactor 200 includes the dual cylinder unit 300. Gas and water which are respectively supplied from the gas supply unit 110 and the water supply unit 120 react with each other. The reactor 200 will be explained in detail later with reference to FIGS. 6A and 6B.

Venturi Valve

Figure 3:
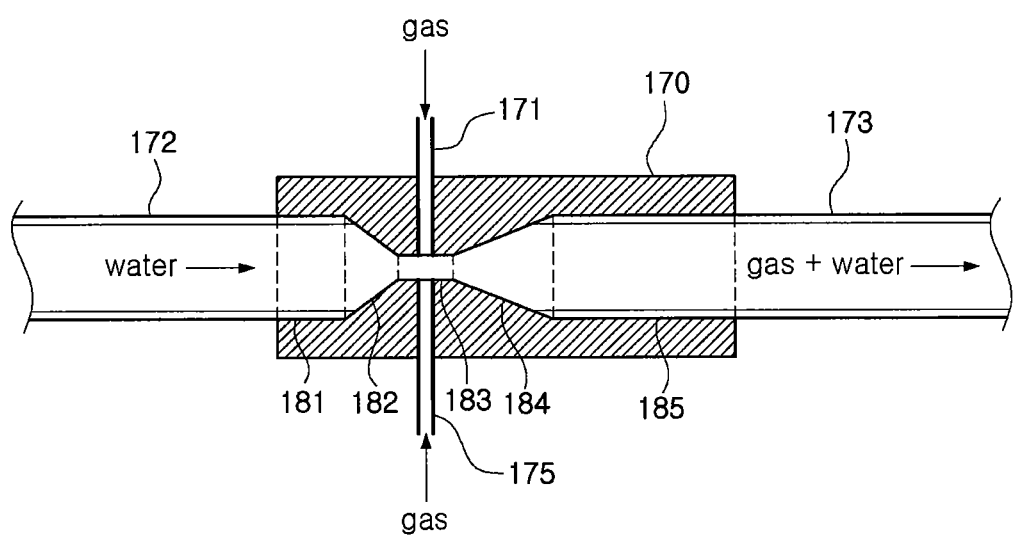
FIG. 3 is a sectional view of a venturi valve of the apparatus of FIG. 2.

Hereinafter, the venturi valve 170 will be explained in detail with reference to FIG. 3.

As one example of the embodiment of the present invention, the apparatus 100 may be configured such that gas and water are supplied from the gas supply unit 110 and the water supply unit 120 into the reactor 200 without using the venturi valve 170. Alternatively, as another example of the embodiment, the apparatus 100 may be configured such that gas supplied from the gas supply unit 110 and water supplied from the water supply unit 120 are automatically mixed with each other in the venturi valve 170 by their flow speeds and a difference in pressure therebetween and then supplied into the reactor 200. In the case where the venturi valve 170 is used, because gas and water are mixed with each other before they are supplied into the reactor 200, the reaction rate of inside the reactor 200 increases.

In the example where the venturi valve 170 is used, a first gas pipe 171, a water supply pipe 172 and a mixture supply pipe 173 are connected to the venturi valve 170. Gas is supplied into the venturi valve 170 through the first gas pipe 171. Water is supplied into the venturi valve 170 through the water supply pipe 172. A mixture of gas and water is supplied from the venturi valve 170 into the reactor 200 through the mixture supply pipe 173.

A fluid passage which is formed in the venturi valve 170 includes a first passage 181 into which water is drawn from the water supply pipe 172, a second passage 182 which is reduced in cross-sectional area along the direction in which the water flows, a third passage 183 which has the smallest cross-sectional area, a fourth passage 184 which is increased in cross-sectional area along the direction in which water flows, and a fifth passage 185 through which fluid is discharged from the venturi valve 170.

With regard to fluid flowing through the venturi valve 170, as the cross-sectional area of the fluid passage gets smaller, the speed of the water increases. When water passes through the third passage 183, the speed of the water reaches a peak. Therefore, the pressure of the water is lowest, so that when the pressure of gas flowing through the first gas pipe 171 is higher than the pressure of water in the third passage 183, gas is automatically supplied into the fluid passage by a difference in pressure. When fluid including water and gas pass through the fourth passage 184, the cross-sectional area of which is increased along the direction in which the fluid flows, the speed of the fluid returns to its original speed.

In other words, because the venturi valve 170 is configured such that the pressure of gas passing through the first gas pipe 171 is higher than that of water passing through the third passage 183, gas is automatically drawn into the venturi valve 170 and mixes with water. The mixture of water and gas is supplied into the reactor 200 through the mixture supply pipe 173.

As a modification of the example where the venturi valve 170 is used, the apparatus 100 may further includes a second gas pipe 175 which is connected to the venturi valve 170 so that gas is resupplied from the reactor 200 into the venturi valve 170 through the second gas pipe 175.

When the apparatus 100 is being operated, reaction water formed by the reaction of gas and water is maintained at a constant level in the reactor 200. Here, the upper portion of the interior of the reactor 200 is filled with a gas which is not involved in the reaction (refer to FIG. 6A).

Some of such gas that is adjacent to the surface of the reaction water reacts with the reaction water and easily dissolves in water. However, gas that is spaced apart from the reaction water cannot easily react with the reaction water.

In this modification, the second gas pipe 175 connects the upper portion of the reactor 200 to the venturi valve 170, so that gas that is not involved in the reaction is returned to the venturi valve 170 through the second gas pipe 175. This operation can be realized by controlling a difference in pressure between the third passage 183 of the venturi valve 170 and the interior of the reactor 200.

As such, in the case where the venturi valve 170 is used, because the venturi valve 170 is configured such that the pressure in the third passage 183 is lower than that in the reactor 200 and the pressure in the fifth passage 185 is higher than that in the reactor 200, gas can automatically circulate in the apparatus 100.

Thanks to the structure allowing gas to continuously circulate, gas that is not involved in the reaction can be returned to the venturi valve 170, mixed with water, and then resupplied into the reactor 200. Hence, the reaction rate between the gas and water can markedly increase.

Moreover, as a modification of the embodiment of the present invention, a separate ejection pump (not shown) may be provided to promote such circulation of gas.

Reactor

Figure 4A:
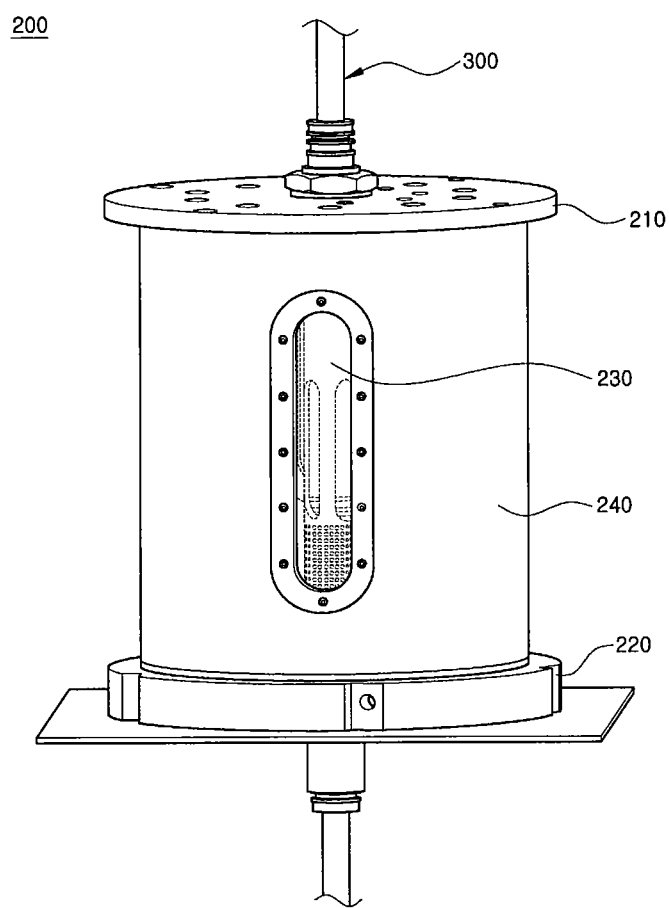
FIGS. 4A and 4B are, respectively, a perspective view and an exploded perspective view of a reactor of the apparatus of FIG. 2.
Figure 4B:
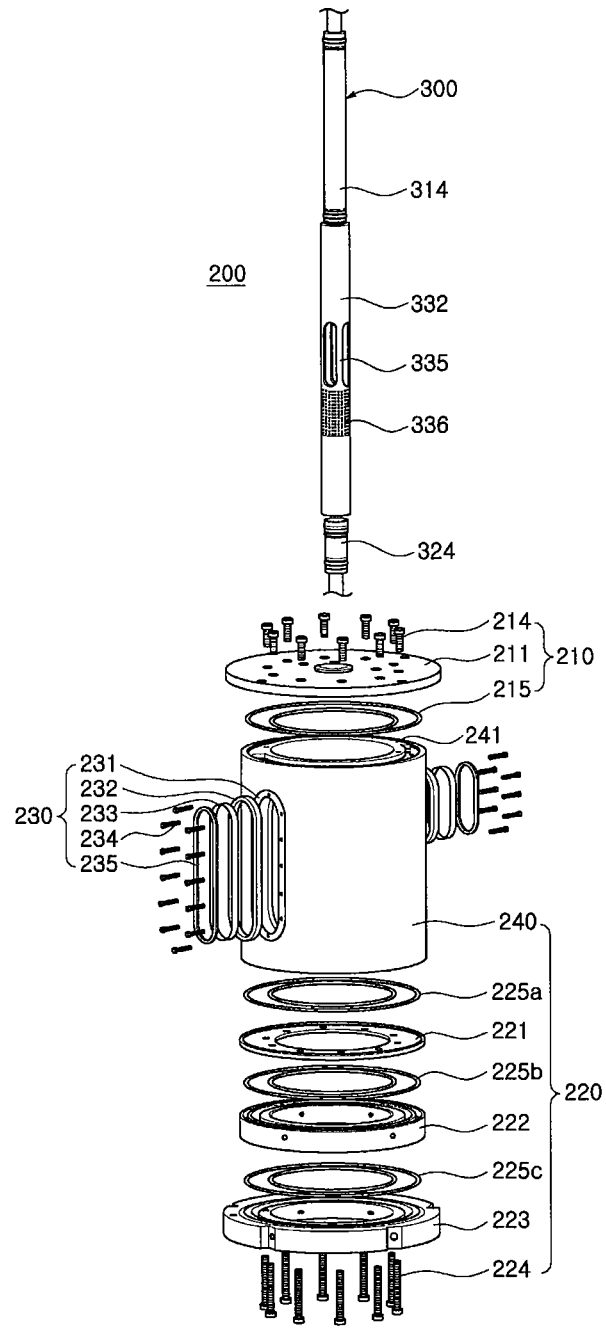

The reactor 200 will be explained in detail with reference to FIGS. 4A and 4B. FIG. 4A is a perspective view of the reactor 200. FIG. 4B is an exploded perspective view of the reactor 200.

The reactor 200 includes an upper plate assembly 210, a lower plate assembly 220, the reactor housing 240 and the dual cylinder unit 300. The reactor housing 240 has observation window assemblies 230. The dual cylinder unit 300 includes a connection pipe 332 which is provided through the reactor housing 240. The upper and lower ends of the connection pipe 332 respectively extend relatively long distances from the upper and lower ends of the reactor housing 240. However, in the drawings, a portion of the connection pipe 332 that is distant from the reactor housing 240 will be omitted from the illustrations for the sake of description.

The upper plate assembly 210 includes an upper plate 211, a sealing member 215 which seals space between the upper plate 211 and the reactor housing 240, and fastening members 214 which couple the upper plate 211 to the reactor housing 240. In this embodiment, an O-ring is illustrated as one example of the sealing member 215, but the present invention is not limited to this. Furthermore, a bolt is illustrated as one example of the fastening member 214, but the scope of the present invention is also not limited to this.

The lower plate assembly 220 includes first, second and third lower plates 221, 222 and 223, sealing members 225a, 225b and 225c and fastening members 224. The sealing members 225a, 225b and 225c seal space between first, second and third lower plates 221, 222 and 223 and the reactor housing 240. The fastening members 224 couple the first, second and third lower plates 221, 222 and 223 and the reactor housing 240 to each other. An O-ring is illustrated as one example of each sealing member 225a, 225b, 225c, but the present invention is not limited to this. Furthermore, a bolt is illustrated as one example of each fastening member 224, but this also does not limit the scope of the present invention. In addition, although three lower plates have been illustrated as being used in this embodiment, the number of the lower plates is not limited to three.

When the operation of forming a gas hydrate is conducted, the pressure in the reactor housing 240 is relatively high. Therefore, the upper plate assembly 210 and the lower plate assembly 220 must be tightly sealed to the reactor housing 240.

Furthermore, the upper plate assembly 210 and the lower plate assembly 220 have, on central portions thereof, openings through which the dual cylinder unit 300 is placed. The space between the connection pipe 332 of the dual cylinder unit 300 and the circumferences of the openings formed through the upper and lower plate assemblies 210 and 220 is also sealed.

The reactor housing 240 is made of a material sufficiently strong to withstand the pressure in the reactor 200. The reactor cooling water line 241 along which cooling water flows is arranged in the reactor housing 240. The temperature in the reactor 200 can be maintained at a desired temperature by the cooling water supplied from the cooling unit 160.

The observation window assemblies 230 are provided in the reactor housing 240, so that the user can monitor the process of forming gas hydrates in the reactor 200. Although two observation window assemblies 230 are illustrated in the drawings, the number of observation window assemblies 230 is not limited.

Each observation window assembly 230 includes an opening 231, a window frame 232, a transparent window 233, a sealing member 235 and fastening members 234. The opening 231 is formed through the reactor housing 240. The window 233 is supported in the window frame 232. The sealing member 235 seals space between the reactor housing 240, the window frame 232 and the window 233. The fastening members 234 couple these components to each other. In this embodiment, although an O-ring is illustrated as one example of the sealing member 235, the present invention is not limited to this. Furthermore, a bolt is illustrated as one example of each fastening member 234, but the scope of the present invention is also not limited to this.

Dual Cylinder Unit

Figure 5:
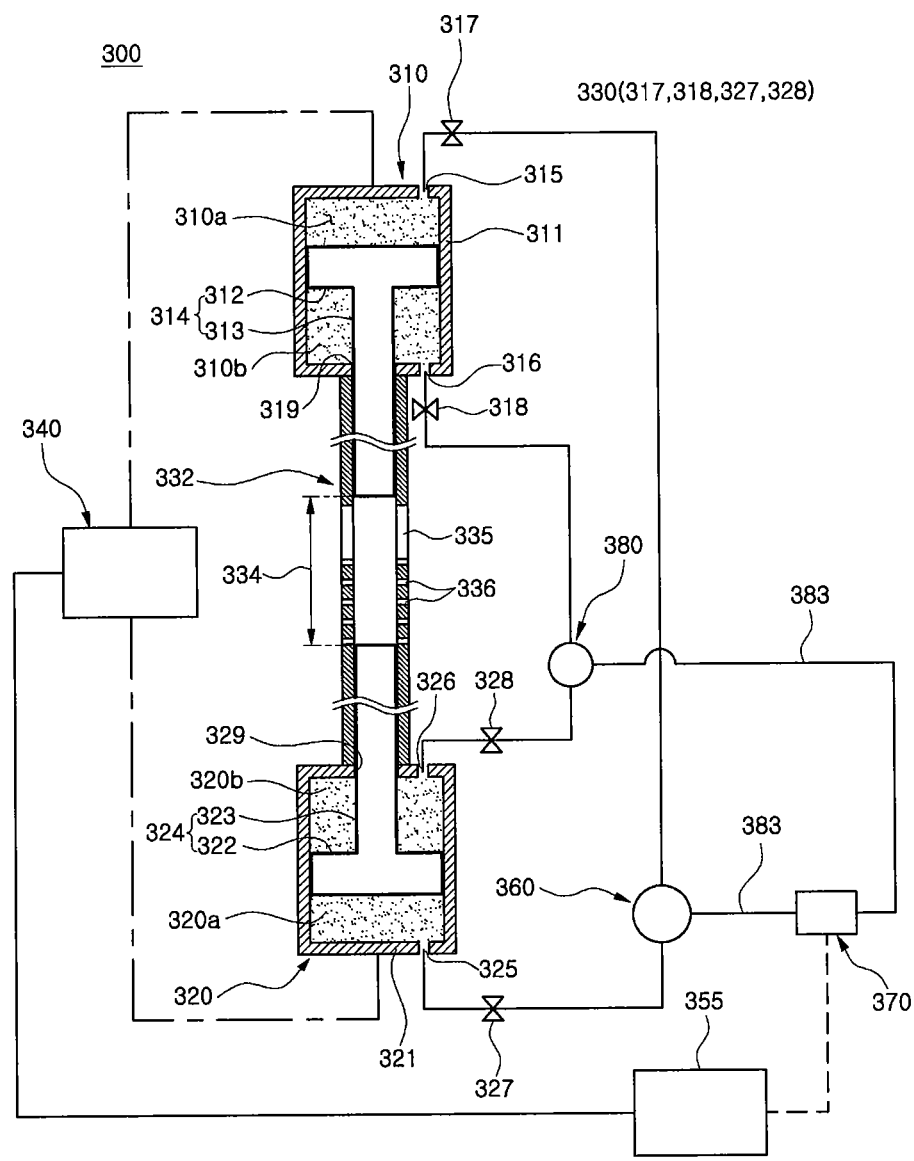
FIG. 5 is a view illustrating the principle behind the operation of a dual cylinder unit of the apparatus of FIG. 2.

Referring to FIGS. 4 and 5, the dual cylinder unit 300 includes an upper cylinder 310 which has an upper piston 314, a lower cylinder 320 which has a lower piston 324 and is spaced apart from the upper piston 314 by a predetermined distance, and the connection pipe 332 which is provided between an upper cylinder 310 and a lower cylinder 320. Although the connection pipe 332 is illustrated as being relatively short in the drawings for the sake of description, it is preferable that the connection pipe 332 be sufficiently long to correspond to the entire length of the path along which the upper piston 314 and the lower piston 324 move.

When the reactor 200 is assembled, the connection pipe 332 protrudes relatively long distances from the upper plate assembly 210 and the lower plate assembly 220 of the reactor 200. As mentioned above, space between the connection pipe 332 and the upper plate assembly 210 and space between the connection pipe 332 and the lower plate assembly 220 are sealed.

Furthermore, while the upper piston 314 and the lower piston 324 are operated, the state of being sealed between the connection pipe 332 and the upper and lower pistons 314 and 324 is maintained. For this, a rod of each of the upper and lower pistons 314 and 324 may include a sealing member, such as an O-ring.

In addition, a plurality of first and second passing holes 335 and 336 is formed in the connection pipe 332. As illustrated in FIG. 4A showing the interior of the reactor 200 through the observation window assembly 230 and in FIGS. 6A through F showing the sectional views of the reactor 200, the first and second passing holes 335 and 336 are positioned in the reactor 200 when the dual cylinder unit 300 is assembled with the reactor 200. Reaction water in the reactor 200 flows into or out of the connection pipe 332 through the first and second passing holes 335 and 336. The functions of the first and second passing holes 335 and 336 will be explained in detail later.

An actuator 340 is connected to the upper cylinder 310 and the lower cylinder 320 of the dual cylinder unit 300, so that drive force is transmitted from the actuator 340 to the upper and lower pistons 314 and 324 of the upper and lower cylinders 310 and 320. The upper cylinder 310 and the lower cylinder 320 which are connected to each other through the connection pipe 332 are filled with incompressible fluid. The incompressible fluid flows between the upper cylinder 310 and the lower cylinder 320 through a plurality of fluid pipes which are connected between the upper cylinder 310 and the lower cylinder 320.

The upper piston 314 and the lower piston 324 are connected to a controller 355. The controller 355 precisely controls the operation of the upper and lower pistons 314 and 324. Furthermore, preferably, level sensors are disposed adjacent to the upper piston 314 and the lower piston 324. Thus, the level sensors transmit heights of the upper and lower pistons 324 and 324 to the controller such that the controller controls the heights of the upper and lower pistons 324 and 324. More preferably, two level sensors 332a and 332b are disposed adjacent to the lower piston 324. The size of a formed gas hydrate can be determined by these level sensors 332a and 332b. This will be explained in detail later with reference to FIGS. 6B and 6E.

Below the dual cylinder unit 300 will be described in more detail with reference to FIG. 5.

The dual cylinder unit 300 includes the upper cylinder 310, the lower cylinder 320 which is spaced apart from the upper cylinder 310 by a predetermined distance, the connection pipe 332 which is provided between the upper cylinder 310 and the lower cylinder 320, and the actuator 340 which is connected between the upper cylinder 310 and the lower cylinder 320.

In the present invention, compressible material is inserted into a space between the upper and lower cylinders 310 and 320 and compressed therebetween into a predetermined volume. To achieve this purpose, the upper cylinder 310 is preferably disposed above the lower cylinder 320. In this case, when material which has been dehydrated through a predetermined process, such as a centrifugal separation process, around the connection pipe 332 is drawn into the connection pipe 332, the material can be automatically compressed by gravity. Of course, the dual cylinder unit 300 can have not only this vertically placed structure but also a horizontally placed structure or an inclined structure.

The upper cylinder 310 includes a first cylindrical casing 311 which has a hollow space therein, and the upper piston 314 which is partially placed in the first cylindrical casing 311 and vertically reciprocates along the first cylindrical casing 311. The upper piston 314 has a "T" shape and includes a first head 312 and a first rod 313. The first piston head 312 partitions the interior space of the first cylindrical casing 311 into a first main chamber 310a and a first subsidiary chamber 310b. In addition, the first piston head 312 moves upwards or downwards along the inner wall of the first cylindrical casing 311. The first main chamber 310a is filled with a first incompressible fluid. The first subsidiary chamber 310b is filled with a second incompressible fluid.

Here, the space between the inner surface of the first cylindrical casing 311 and the first piston head 312 must be completely sealed. The first rod 313 is coupled to the lower surface of the first piston head 312 and extends into the connection pipe 332 through a first communication hole 319 which is formed through the lower surface of the first cylindrical casing 311.

The lower cylinder 320 has a shape similar to that of the upper cylinder 310. That is, the lower cylinder 320 includes a second cylindrical casing 321 which has a hollow space therein, and the lower piston 324 which is partially placed in the second cylindrical casing 321 and vertically reciprocates along the second cylindrical casing 321. In the same manner, the lower piston 324 has a "T" shape and includes a second piston head 322 and a second rod 323. In more detail, the lower piston 324 is disposed in a reverse "T" shape. The second piston head 322 partitions the interior space of the second cylindrical casing 321 into a second main chamber 320a and a second subsidiary chamber 320b. In addition, the second piston head 322 moves upwards or downwards along the inner wall of the second cylindrical casing 321. The second main chamber 320a is filled with the first incompressible fluid. The second subsidiary chamber 320b is filled with the second incompressible fluid.

Here, the space between the inner surface of the second cylindrical casing 321 and the second piston head 322 must also be completely sealed. The second rod 323 is coupled to the upper surface of the second piston head 322 and extends into the connection pipe 332 through a second communication hole 329 which is formed through the upper surface of the second cylindrical casing 321.

The opposite ends of the connection pipe 332 are respectively connected to the upper cylinder 310 and the lower cylinder 320 through the first communication hole 319 and the second communication hole 329. The connection pipe 332 has therein a space appropriate to reciprocate the first and second rods 313 and 323 of the first and second piston 314 and 324 along the connection pipe 332 while maintaining a state of being sealed between the connection pipe 332 and the first and second rods 313 and 323. Preferably, the connection pipe 332 must be made of pressure-proof material, because a relatively high pressure is formed in the connection pipe 332.

During a process in which water (host molecules), in which guest molecules are dissolved, passes through the first and second passing holes 335 and 336 formed through the sidewall of the connection pipe 332, it is compressed and dehydrated in the connection pipe 332 and thus pelletized and output into a predetermined solid phase. Here, because the spaces between the communication holes 319 and 329 and the rods 313 and 323 of the pistons 314 and 324 are in the sealed state, the second incompressible fluid is prevented from leaking out of the upper or lower cylinder 310 or 320 through the connection pipe 332. Hence, the first and second passing holes 335 and 336 can be formed in the connection pipe 332 without having to consider leakage of the incompressible fluid. Reaction water can smoothly pass into or out of the connection pipe 332 through the first and second passing holes 335 and 336.

The controller 355 is electrically connected to the actuator 340 and controls the operation of the upper and lower pistons 314 and 324 of the upper and lower cylinders 310 and 320. The controller 355 controls the actuator 340 and the upper and lower pistons 314 and 324 such that the upper and lower pistons 314 and 324 move predetermined distances upwards or downwards by the operation of the actuator 30 in the state in which a distance 334 between the upper and lower pistons 314 and 324 is maintained constant. When it is necessary to adjust the distance 334 between the upper and lower pistons 314 and 324, the controller can precisely control the distance 334 using the actuator 340 and the incompressible fluid that flows between the upper and lower cylinders 310 and 320. Furthermore, the controller 355 is connected to a plurality of control valves 330 which are provided on pipelines connecting the upper cylinder 310 to the lower cylinder 320. Thus, the turning on or off of the pipelines can be controlled by the controller 355. The control valves 330 include first and second main control valves 317 and 327 and first and second subsidiary control valves 318 and 328.

Hereinafter, the internal structure of the dual cylinder unit 300 which is related to the flow of the incompressible fluid stored in the first and second main chambers 310a and 320a and the first and second subsidiary chambers 310b and 320b will be explained in detail.

A first main hole 315 and a first subsidiary hole 316 are respectively formed through the upper and lower surfaces of the first cylindrical casing 311, such that the first main hole 315 and the first subsidiary hole 316 respectively communicate with the first main chamber 310a and the first subsidiary chamber 310b. A second main hole 325 and a second subsidiary hole 326 are respectively formed through the lower and upper surfaces of the second cylindrical casing 321, such that the second main hole 325 and the second subsidiary hole 326 respectively communicate with the second main chamber 320a and the second subsidiary chamber 320b.

Furthermore, the first main hole 315 is connected to the second main hole 325 via a first flow path change valve 360. The first subsidiary hole 316 is connected to the second subsidiary hole 326 via a second flow path change valve 380. The first flow path change valve 360 is directly connected to the second flow path change valve 380 through a connection pipeline 383. An orifice device 370 is provided on the connection pipeline 383. Each of the first and second flow path change valves 360 and 380 may comprise a 3-way valve. The orifice device 370 controls and measures a flow rate of the incompressible fluid which flows between the first flow path change valve 360 and the second flow path change valve 380, so that the incompressible fluid can smoothly flow through the connection pipeline 383. Furthermore, the control valves 330 are provided to control the flow of incompressible fluid between the chambers 310a, 310b, 320a and 320b of the cylindrical casings 311 and 321.

The control valves 330 are classified according to their position of installation as follows. A first main control valve 317 is disposed on a pipeline provided between the first flow path change valve 360 and the first main hole 315. A second main control valve 327 is disposed on a pipeline provided between the first flow path change valve 360 and the second main hole 325. In the same manner, a first subsidiary control valve 318 is disposed on a pipeline provided between the second flow path change valve 380 and the first subsidiary hole 316. A second subsidiary control valve 328 is disposed on a pipeline provided between the second flow path change valve 360 and the second subsidiary hole 326.

The first and second flow path change valves 360 and 380, the orifice device 370, the first and second main control valves 317 and 327 and the first and second subsidiary control valves 318 and 328 are electrically connected to the controller 355.

Operation of the Dual Cylinder Unit

The operation of the dual cylinder unit 300 and a process of forming gas hydrates by the operation of the dual cylinder unit 300 will be explained in detail with reference to FIGS. 6A through 6F.

The dual cylinder unit 300 repeatedly conducts a cycle including an "initial state", a "slurry suction state", a "squeezing stroke" and an "extracting state". Here, the "squeezing stroke" may comprise several squeezing strokes. Furthermore, the positions of the upper piston 314 or the lower piston 324 when it is in the "initial state", the slurry suction state" and the "extracting state" are respectively designated as an "initial position", a "slurry suction position" and a "discharge position".

Figure 6A:
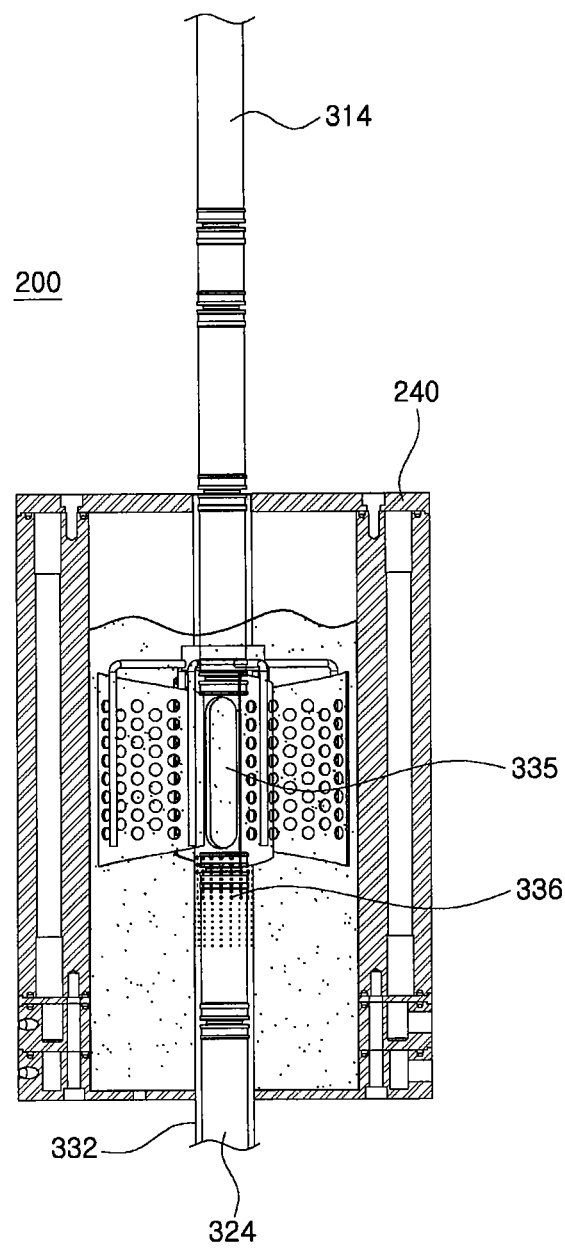
FIGS. 6A through 6F are sectional views illustrating successive operations of reactions in the reactor of the apparatus of FIG. 2.

FIG. 6A illustrates the "initial state" of the dual cylinder unit 300.

The initial state means a preparation state before the operation forming a gas hydrate begins. In the initial state, as shown in FIG. 6A, the upper piston 314 and the lower piston 324 are at their initial positions. In this state, water and gas may be directly supplied into the reactor 200 or, alternatively, water and gas may be mixed with each other by the venturi valve 370 before they are supplied into the reactor 200. In FIG. 6A, although the lower piston 324 is illustrated as opening the first passing holes 335 and closing the second passing holes 336, the operation of the lower piston 324 is not limited to this.

Figure 6B:
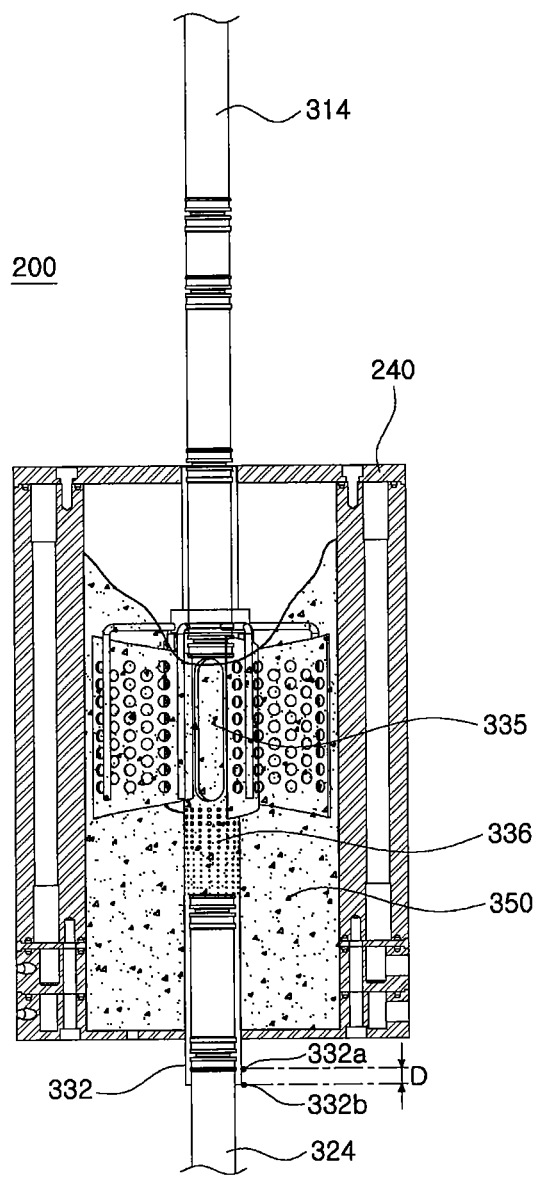

FIG. 6B illustrates the "slurry suction state" of the dual cylinder unit 300.

After the operation of forming a gas hydrate begins, sufficient amounts of water and gas are supplied into the reactor 200 such that the densities of water and gas in the reactor 200 reach preset degrees. After sufficient amounts of water and gas are supplied into the reactor 200 or while sufficient amounts of water and gas are being supplied into the reactor 200, water and gas in the reactor 200 are agitated at high speed by a separate agitator (not shown) such that reaction therebetween is promoted.

After the densities of water and gas in the reactor 200 reach the preset degrees, the lower piston 324 is moved to open both the first passing holes 335 and the second passing holes 336 before the water and gas are agitated or while they are agitated. The connection pipe 332 may have two sensors 332a and 332b which are disposed adjacent to the lower piston 324 at different heights. In the slurry suction state, the lower piston 324 is disposed such that a predetermined reference point of the lower piston 324 corresponds to the height of the upper sensor 332a.

Water and gas which react with each other gradually form a slurry 350. The slurry 350 can become concentrated at the central portion of the reactor 200 by high-speed agitation. Most of the slurry 350 that is concentrated at the central portion of the reactor 200 is drawn into the connection pipe 332 by centrifugal force and goes through the first passing holes 335. Some of the slurry 350 is drawn into the connection pipe 332 through the second passing holes 336.

Figure 6C:
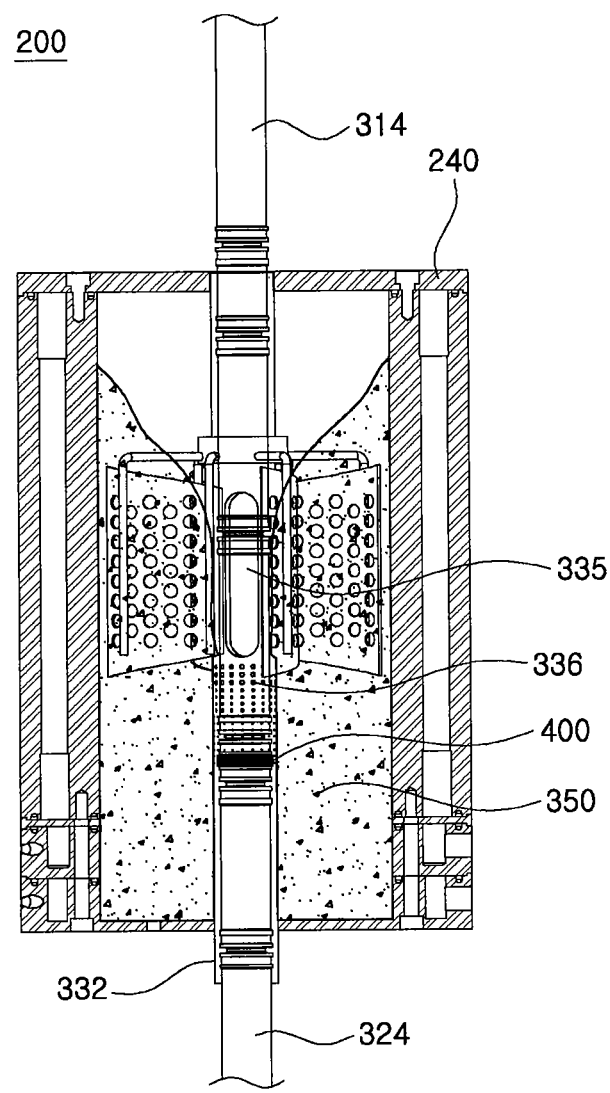
Figure 6D:
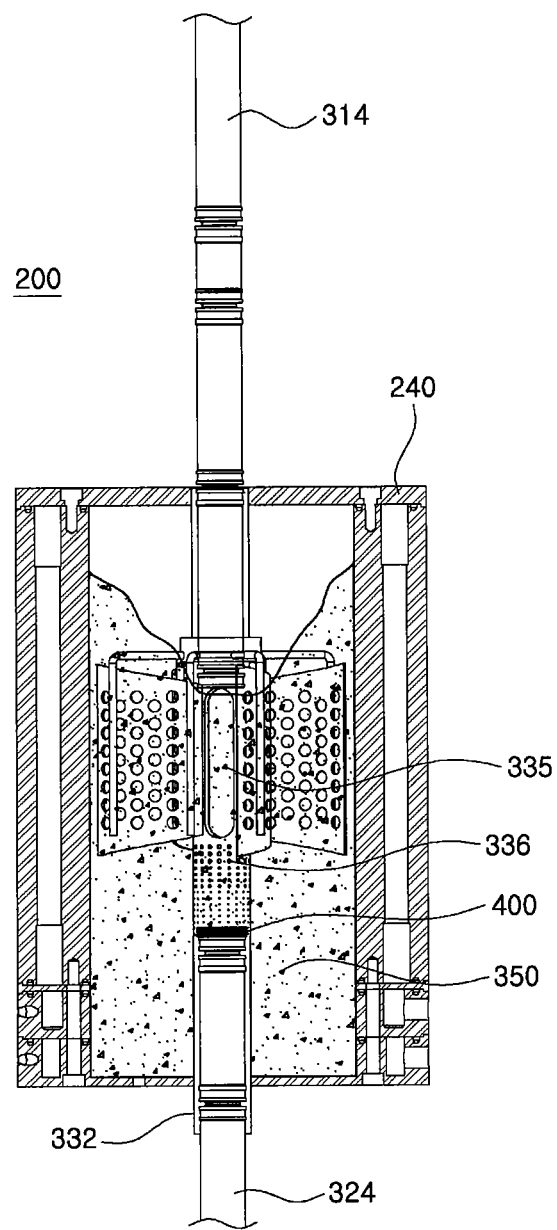
Figure 6E:
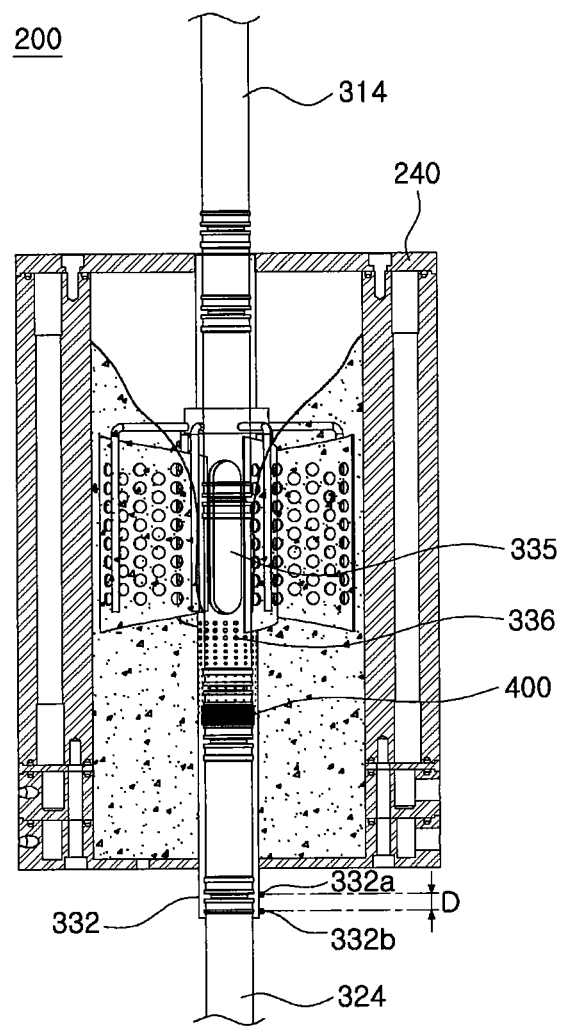

FIGS. 6C through 6E illustrate the "squeezing stroke" of the dual cylinder unit 300. Here, the term "squeezing" must be interpreted as having a meaning of "compression" and "dehydration" of slurry or gas hydrates owing to the compression. In some cases, the term "squeezing" may include a meaning of pelletization of gas hydrates.

When a sufficient amount of slurry is drawn into the connection pipe 332, the upper piston 314 moves downwards at a constant speed to squeeze the slurry. Then, water (moisture) is removed from the slurry by the upper piston 314 that compresses the slurry. Here, only water (moisture) is removed out of the connection pipe 332 through the second passing holes 336 while the slurry which is a solid is prevented from being removed out of the connection pipe 332. For this, it is preferable that the second passing holes 336 be of relatively small sizes to be capable of preventing the slurry from leaving the connection pipe 332.

The upper piston 314 can be operated by hydraulic pressure. The upper piston 314 can squeeze the slurry at a relatively high pressure ranging from 100 kg/cm$^2$ to 200 kg/cm$^2$. Due to the upper piston 314 being operated at a high pressure and the small sizes of the second passing holes 336, the slurry can be reliably compressed and dehydrated during the squeezing stroke. When necessary, the slurry may be pelletized while it is compressed and dehydrated.

Such a squeezing stroke may be repeatedly conducted several times. The number of times the squeezing strokes are made can be predetermined by a user.

FIG. 6C illustrates a state (a first squeezing stroke) in which the upper piston 314 is moved downwards. FIG. 6D illustrates a state in which the upper piston 314 is moved upwards to conduct a recompressing process. FIG. 6E illustrates a state (a second squeezing stroke) in which the upper piston 314 is moved downwards again.

To form a gas hydrate 400 between the upper piston 314 and the lower piston 324, every time the upper piston 314 moves downwards to compress the slurry, the lower piston 324 must gradually move a predetermined distance downwards. When all squeezing strokes have been conducted for a preset number of times, the lower piston 324 is disposed such that the reference point of the lower piston 324 corresponds to the height of the lower sensor 332b.

In other words, during the squeezing stroke, the lower piston 324 moves downwards such that the reference point of the lower piston 324 moves from the position corresponding to the upper sensor 332a to the position corresponding to the lower sensor 332b. Hence, the height of the formed gas hydrate 400 becomes the same as a height difference D between the upper and lower sensors 332a and 332b. Thus, the height of the gas hydrate 400 to be formed can be controlled by changing the position (height) of the upper or lower sensor 332a or 332b.

Figure 6F:
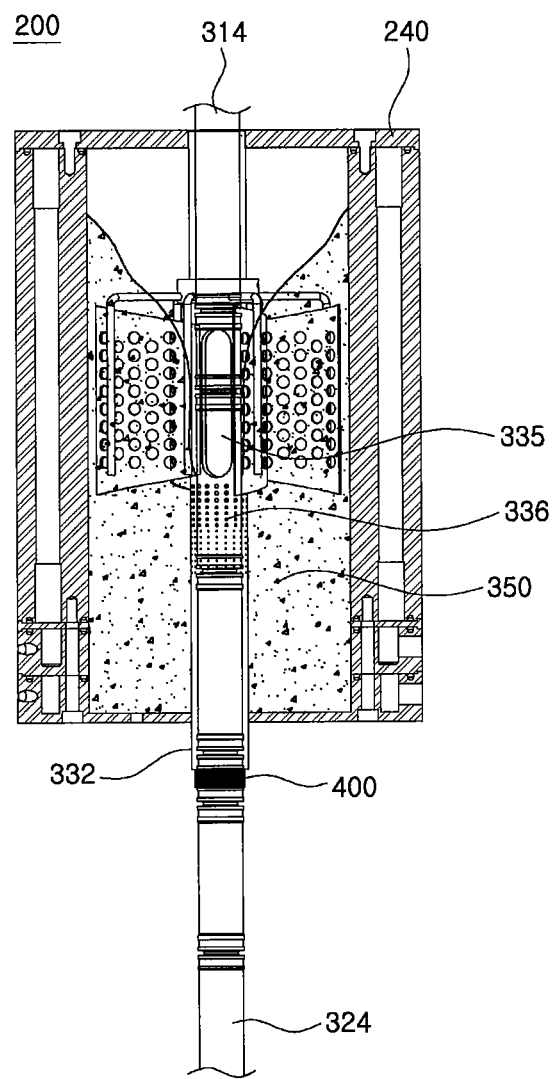

FIG. 6F illustrates the "extracting state" of the dual cylinder unit 300.

After the process of forming the gas hydrate 400 is completed, the upper piston 314 and the lower piston 324 move downwards at the same speed along the connection pipe 332. Thereby, the gas hydrate 400 formed between the upper and lower pistons 314 and 324 also moves along with them. Ultimately, the gas hydrate 400 reaches a position corresponding to the pelletizer 140 and the extraction hole 260 through which the gas hydrate 400 is extracted. This position is designated as the "extraction position". A method of extracting the gas hydrate 400 will be explained in detail later with reference to FIG. 7.

After the gas hydrate 400 has been extracted, the upper piston 314 and the lower piston 324 are returned to the initial state (of FIG. 6A) or the slurry suction state (of FIG. 6B) to prepare a subsequent process.

In the present invention, the dual cylinder unit 300 is installed in the reactor 200. Thus, while the slurry is being formed in the reactor 200, a high-density gas hydrate pellet can be formed through the process of squeezing the slurry.

As such, because the operation of forming slurry, the operation of squeezing the slurry and the operation of forming a gas hydrate pellet are conducted at the same time, a separate additional process is not required. Hence, the production efficiency of the apparatus 100 is enhanced. Furthermore, special control for each operation is not required. Special devices for maintaining the temperature or pressure during each operation are not required. Moreover, the fact that a dehydrated high-density gas hydrate pellet can be formed is a special advantage of the present invention, quite unlike the conventional techniques.

The positions of the upper piston 314 and the lower piston 324 according to a state/stroke are as shown in the following Table. 1.

TABLE 1

| State | Upper piston (314) | Lower piston (324) | Reference drawings |
|---|---|---|---|
| Initial state | A | X | FIG. 5A |
| Slurry suction state | A | Y | FIG. 5B |
| Squeezing stroke | A ⇆ B | Y → Y' | FIGS. 5C~5E |
| Extracting state | C | Z | FIG. 5F |

Here, the character A denotes a position (height) of the upper piston 314 in the initial state (of FIG. 6A). The character B denotes a position (height) of the upper piston 314 when it is at the lowermost position during the squeezing stroke (as shown in FIG. 6C). During the squeezing stroke, the upper piston 314 reciprocates between positions A and B.

Furthermore, the character X denotes a position (height) of the lower piston 324 in the initial state (of FIG. 6A). The character Y denotes a position (height) of the lower piston 324 in the slurry suction state (of FIG. 6B). The character Y' denotes a position (height) of the lower piston 324 when the squeezing stroke is completed (as shown in FIG. 6E). The position Y corresponds to a position (height) of the upper sensor 332a. The position Y' corresponds to a position (height) of the lower sensor 332b. A difference in height between positions Y and Y' is designated by the character D of FIG. 6E. The size of a gas hydrate 400 can be determined by controlling the height difference D.

The characters C and Z respectively denote positions (heights) of the upper and lower pistons 314 and 324 in the extracting state (of FIG. 6F).

Extraction of Gas Hydrate

Figure 7:
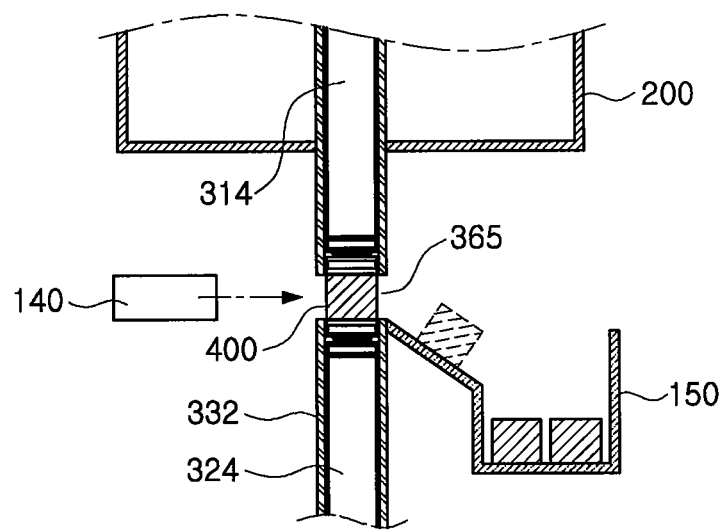
FIG. 7 is a view illustrating a process of extracting a gas hydrate pellet produced by the apparatus of FIG. 2.

The method of extracting the formed gas hydrate 400 will be explained in detail with reference to FIG. 7.

After the gas hydrate 400 is completed, the upper piston 314 and the lower piston 324 move downwards along the connection pipe 332. In detail, the connection pipe 332 is provided through the reactor 200 and the opposite ends thereof extend for predetermined lengths from the upper and lower ends of the reactor 200. The extraction hole 260 through which gas hydrates 400 are extracted is formed in the portion of the connection pipe 332 that protrudes from the lower end of the reactor 200 (refer to FIG. 2). Therefore, after the gas hydrate 400 is completed, the upper piston 314 and the lower piston 324 move downwards to the extraction position such that the gas hydrate 400 is disposed at a position corresponding to the extraction hole 260.

The pelletizer 140 is installed at a predetermined position corresponding to the extraction hole 260. When the dual cylinder unit 300 moves downwards to the extraction position and the gas hydrate 400 is positioned at the position corresponding to the extraction hole 260, the pelletizer 140 pushes the gas hydrate 400 into the storage container 150 which is installed at a position opposite to the pelletizer 140.

The storage container 150 is maintained at a temperature and/or pressure appropriate to store a plurality of gas hydrates 400 therein.

Formation of Gas Hydrates

Figure 8:
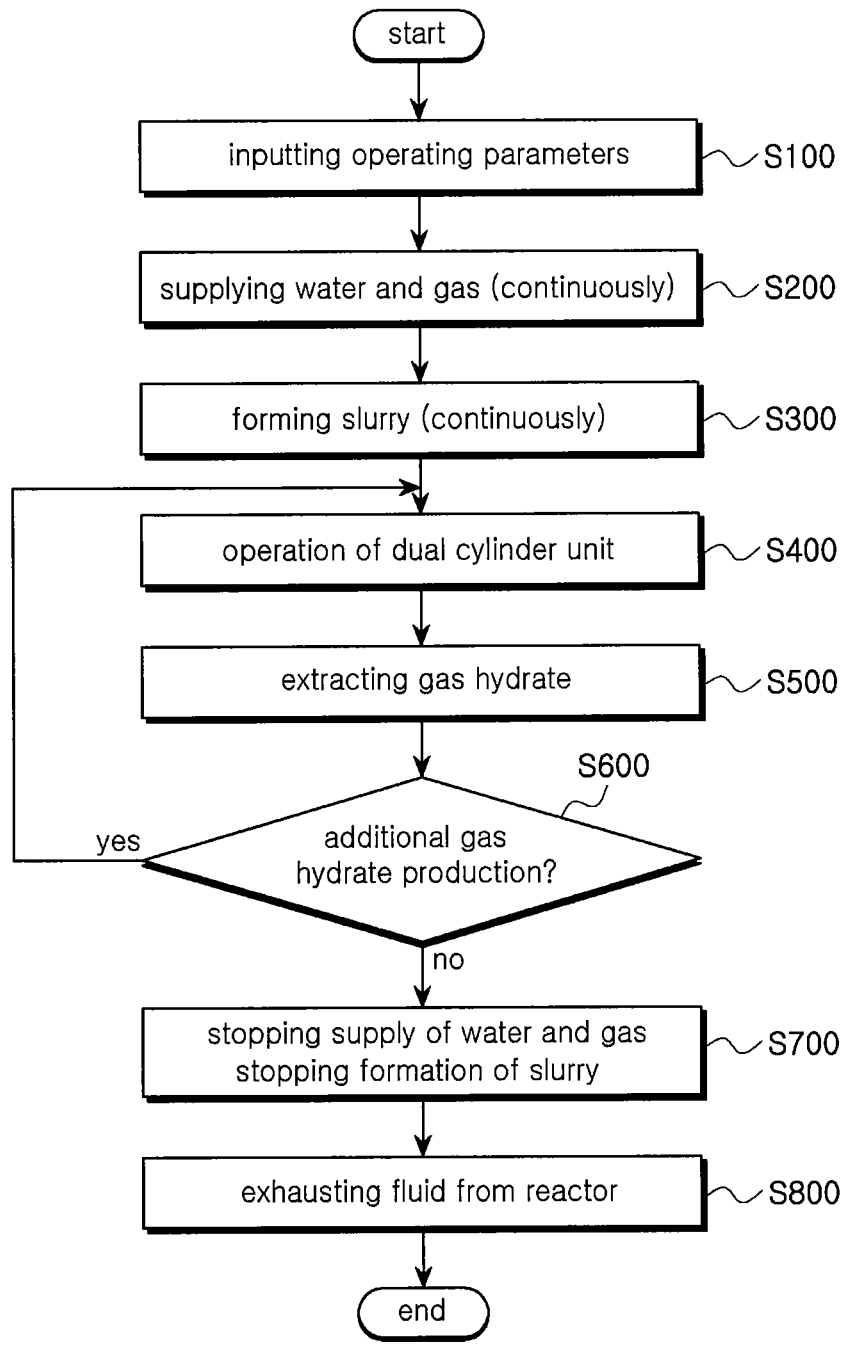
FIG. 8 is a flowchart of a method of consecutively producing gas hydrates, according to an embodiment of the present invention.

Hereinafter, the method of forming a gas hydrate will be explained in detail with reference to FIG. 8.

At operation S100, the user selects guest molecules using the control unit (not shown) connected to the controller (not shown) and inputs operation parameters, such as a temperature, a pressure, etc., corresponding to the guest molecules, required to form the gas hydrate. In addition, the user can determine the number of times the squeezing strokes of the dual cylinder unit 300 are made, a total amount of gas hydrates to be formed, amounts of water and gas to be supplied, etc.

According to the operation parameters which are input, gas and water are respectively supplied into the reactor 200 from the gas supply unit 110 and the water supply unit 120. The gas and water may be directly supplied into the reactor 200 or, alternatively, they may be supplied into the reactor 200 via the venturi valve 170.

In the embodiment, a predetermined amount of water is directly supplied from the water supply unit 120 into the reactor 200 and then additional water and gas are supplied into the reactor 200 via the venturi valve 170. Whether the amount of water and gas reaches a predetermined level can be detected by the level sensor (not shown) provided in the reactor 200.

The gas and water supplied into the reactor 200 are agitated, thus forming reaction water. Thereby, slurry is formed, at operation S300.

In the present invention, gas hydrates are consecutively formed. In other words, slurry is continuously formed by water and gas, and gas hydrates are continuously formed from the slurry and extracted out of the apparatus. Therefore, water and gas must be continuously supplied to continuously form slurry. That is, the water and gas supplying operation S200 and the slurry agitating operation S300 are continuously conducted, so long as the entire operation is in progress.

Meanwhile, shortages of water and gas can be discerned by the level sensor and the pressure sensor (not shown) which are provided in the reactor 200. Water and gas can automatically be added supplementarily into the reactor 200 under the control of the controller (not shown).

At operation S400, when the forming of slurry begins, the dual cylinder unit 300 is operated to form a gas hydrate. As mentioned above, the present invention is specially characterized in that the slurry squeezing operation, the dehydration operation and the gas hydrate pellet forming operation can be conducted at the same time only by the operation of the dual cylinder unit 300. Subsequently, the formed gas hydrate is extracted into the storage container 150 by the pelletizer 140, at operation S500. The order of the operation of the dual cylinder unit 300 which achieves the special characteristics of the present invention will be explained later with reference to FIG. 9.

At operation S600, if it is desired to form an additional gas hydrate, the dual cylinder unit 300 is continuously operated to consecutively form gas hydrates, or if not, the operation thereof is stopped. Here, the desired total output of gas hydrates or the total supply amounts of gas and water can be previously input to the controller (not shown) by the user. Thus, whether forming the additional gas hydrate is able to be automatically determined depends on the preset values of either the total output of gas hydrates or the total amounts of gas and water which are supplied.

If it is no longer necessary to form an additional gas hydrate, the supply of water and gas is stopped and the forming of slurry is thus stopped, at operation S700. Thereafter, at operation S800, fluid which remains in the reactor 200 is exhausted out of the reactor 200 through the exhaust unit 130.

If it is required to form an additional gas hydrate, the dual cylinder unit 300 is continuously operated. Water and gas are also continuously supplied into the reactor 200 in response to the amounts of water and gas which become reduced as gas hydrates are formed. Slurry is also continuously formed in the reactor 200.

As such, gas hydrates are continuously formed by the consecutive operation of the dual cylinder unit 300 and then extracted into the storage container 150. The consecutive operation of the dual cylinder unit 300 means repetition of the above-mentioned gas hydrate forming cycle.

Operation Order of Dual Cylinder Unit

Figure 9:
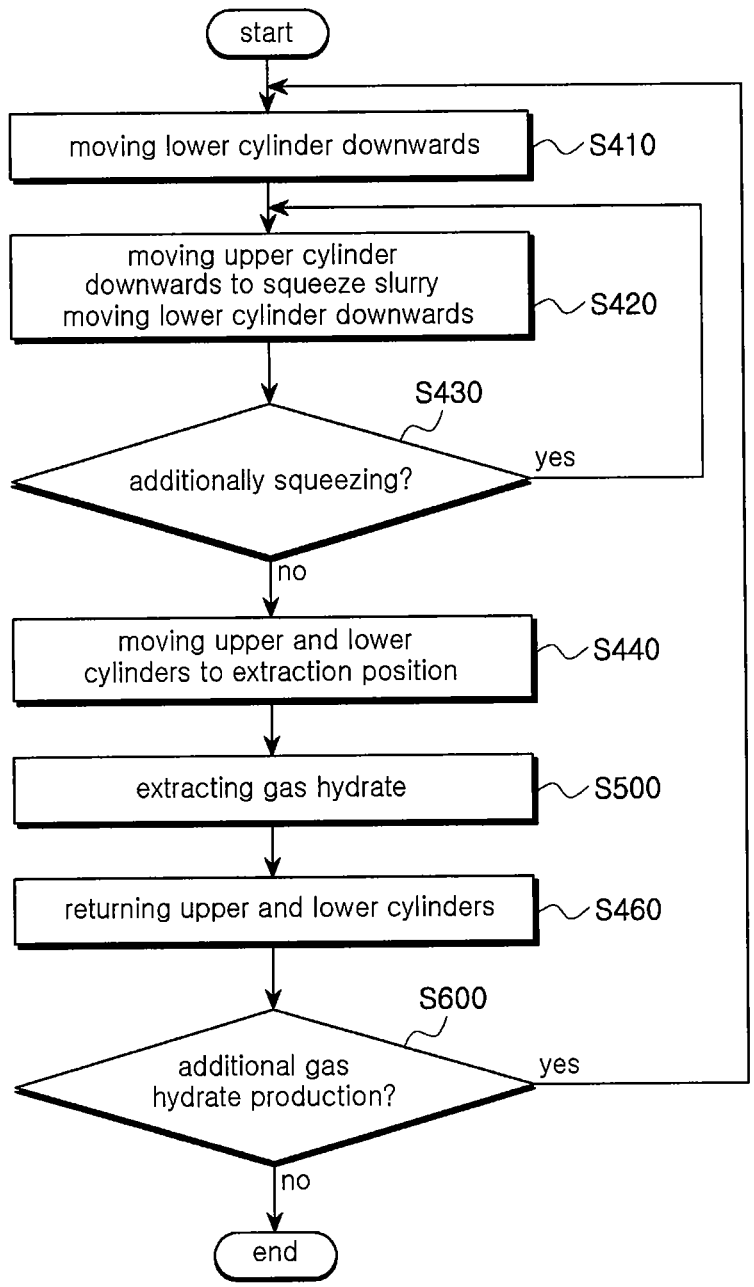
FIG. 9 is a flowchart of the operation of the dual cylinder unit during the process of consecutively producing gas hydrates according to the present invention.

Hereinafter, the operation order of the dual cylinder unit 300 and operations (S400 through S600) of forming and extracting a gas hydrate according to the operation order will be explained with reference to FIG. 9.

As soon as the operation of the apparatus 100 begins or while slurry is formed in the reactor, the lower piston 324 moves downwards to a predetermined position and enters the slurry suction state, at operation S410. In this state, the lower piston 324 is preferably disposed at a position such that all the passing holes 335 and 336 of the connection pipe 332 open (refer to FIG. 6B).

While slurry is being formed in the reactor 200, the upper piston 314 moves downwards and begins the squeezing stroke during which slurry is compressed, and the lower piston 324 also moves gradually in response to the downward movement of the upper piston 314, at operation S420. The slurry is compressed/dehydrated by the squeezing operation and, as necessary, it may be pelletized (refer to FIGS. 6C through 6E).

In other words, thanks to the squeezing stroke, a separate dehydrating or pelletizing process is not required. Dehydrated high-density gas hydrate pellets can be efficiently produced in the same space.

At operation S430, when one squeezing stroke is completed, whether an additional squeezing stroke is necessary is determined. The user can previously set the total number of squeezing strokes to be conducted during a single gas hydrate forming cycle using the controller (not shown). When all the squeezing strokes are completed and the forming of a gas hydrate is completed, both the upper piston 314 and the lower piston 324 move downwards to the extraction position, at operation S440.

At operation S500, the pelletizer 140 extracts the formed gas hydrate at the extraction position into the storage container 150.

After the gas hydrate is extracted, the upper piston 314 and the lower piston 324 are returned to the initial position to prepare a subsequent process, at operation S460.

Thereafter, at operation S600, whether formation of an additional gas hydrate is required is determined, as stated above. If formation of an additional gas hydrate is necessary, the dual cylinder unit 300 repeats the gas hydrate forming cycle.

As described above, in an apparatus for consecutively producing and pelletizing gas hydrates using a dual cylinder unit according to the present invention, the dual cylinder unit can form slurry from reaction water in a reactor and simultaneously produce a gas hydrate. Therefore, gas hydrates can be consecutively produced only by continuously supplying water and gas into the reactor which is maintained at a predetermined temperature and pressure.

Furthermore, the gas hydrate can be directly formed in the reactor by a squeezing stroke of the dual cylinder unit. Therefore, a separate complex gas hydrate forming process which is conducted after the gas and water have reacted with each other can be omitted, so that separate units or processes required to maintain the temperature and pressure of the components of the apparatus constant can be omitted. As a result, gas hydrates can be rapidly and consecutively produced and power consumption can be reduced.

Particularly, unlike the conventional techniques, while slurry is formed by the reaction of gas with water, a dehydrated high-density gas hydrate can be simultaneously formed in the same space. Therefore, a separate slurry forming/dehydrating/pelletizing process is not required. Thus, gas hydrates can be efficiently and consecutively produced.

In addition, the size of a gas hydrate to be produced can be easily controlled only by adjusting the positions of sensors provided on a lower cylinder of the dual cylinder unit.

Moreover, the apparatus of the present invention includes a venturi valve which is configured such that gas and water automatically mix with each other because of a pressure difference, and the mixing/reaction of gas with water is promoted. Hence, the time taken to produce a gas hydrate can be reduced compared to the conventional techniques.

Furthermore, gas which is not involved in the reaction with the water in the reactor is recycled. Thus, the mixing/reaction of gas with water can be further promoted. The time taken to produce a gas hydrate can be further reduced.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. An apparatus for consecutively producing and pelletizing gas hydrates, comprising:
   a gas supply unit;
   a water supply unit; and
   a reactor into which gas and water are respectively supplied from the gas supply unit and the water supply unit, so that the gas and water react with each other in the reactor,
   wherein the reactor comprises a dual cylinder unit forming a gas hydrate in such a way as to squeeze a slurry of reaction water formed by the reaction between the gas and water, and
   the dual cylinder unit comprises:
   an upper cylinder;
   a lower cylinder; and
   a connection pipe connecting the upper cylinder to the lower cylinder,
   wherein the connection pipe has a plurality of passing holes through which the reaction water in the reactor flows into and out of the connection pipe.

2. The apparatus as set forth in claim 1, wherein
   the upper cylinder comprises: an upper piston; and an upper cylinder casing in which a portion of the upper piston is placed, the upper cylinder casing containing an incompressible fluid,
   the lower cylinder comprises: a lower piston; and a lower cylinder casing in which a portion of the lower piston is placed, the lower cylinder casing containing the incompressible fluid, and
   the dual cylinder unit further comprises:
   an actuator connected to the upper cylinder and the lower cylinder to provide drive force to the upper and lower cylinders; and
   a pipeline connecting the upper cylinder casing to the lower cylinder casing to guide flow of the incompressible fluid between the upper cylinder casing and the lower cylinder casing, wherein
   movement of the upper and lower pistons is controlled by the flow of the incompressible fluid between the upper and lower cylinder casings through the pipeline.

3. The apparatus as set forth in claim 2, wherein the pipeline comprises:
   a first pipeline having a pair of flow path change valves thereon; and
   a second pipeline connecting the pair of flow path change valves to each other, wherein
   the actuator and the flow path change valves are electrically connected to a controller.

4. The apparatus as set forth in claim 3, wherein the controller controls directions in which the flow path change valves are opened or closed, such that a distance between the upper piston and the lower piston is maintained constant or changes.

5. The apparatus as set forth in claim 1, wherein the slurry of the reaction water is drawn into the dual cylinder unit through the passing holes of the connection pipe by rotation of the reaction water, and
   the slurry is squeezed by a squeezing stroke of the upper and lower pistons.

6. The apparatus as set forth in claim 1, wherein the lower cylinder comprises two sensors provided at different heights,
   whereby a height of the formed gas hydrate is controlled by adjusting the heights of the two sensors.

7. The apparatus as set forth in claim 1, wherein the plurality of passing holes comprise a first passing hole and a second passing hole, wherein
   the first passing hole is positioned above the second passing hole, and
   the first passing hole is larger than the second passing hole.

8. The apparatus as set forth in claim 1, further comprising:
   a venturi valve connected to the gas supply unit through a first gas supply pipe, the venturi valve being connected to the water supply unit through a water supply pipe and being connected to the reactor through a mixture supply pipe.

9. The apparatus as set forth in claim 8, wherein the venturi valve is connected to the reactor through a second gas supply pipe.

10. The apparatus as set forth in claim 9, wherein gas supplied from the gas supply unit through the gas supply pipe is mixed, by the venturi valve, with water supplied from the water supply unit through the water supply pipe, and then a mixture of the gas and the water is supplied into the reactor through the mixture supply pipe, and
    gas other than gas reacting with water in the reactor is returned to the venturi valve through the second gas pipe and mixed with water supplied into the venturi valve and then resupplied into the reactor through the mixture supply pipe.

11. The apparatus as set forth in claim 1, further comprising:
    a pelletizer extracting the formed gas hydrate out of the dual cylinder unit.

12. The apparatus as set forth in claim 11, wherein the dual cylinder unit has an extraction hole, and
    the pelletizer is operated when the gas hydrate formed in the dual cylinder unit is disposed at a position corresponding to the extraction hole.

13. The apparatus as set forth in claim 1, further comprising:
    a cooling unit, wherein
    the reactor further comprises a plurality of cooling water paths formed in a housing of the reactor, the cooling water paths communicating with the cooling unit.

* * * * *